3,745,042
METHOD OF HYDROPHILIZATION OF TRANSPARENT OBJECTS MADE OF HYDROPHOBIC ORGANIC POLYMERS

Drahoslav Lim, Jindrich Kopecek, and Jiri Vacik, Prague, Czechoslovakia, assignors to Ceskoslovenska akademie ved, Prague, Czechoslovakia
No Drawing. Filed Oct. 26, 1970, Ser. No. 84,134
Claims priority, appplication Czechoslovakia, Dec. 15, 1969, 8,250/69
Int. Cl. B44d 1/50, 1/02; G02c 7/04
U.S. Cl. 117—138.8 A                                                  7 Claims

ABSTRACT OF THE DISCLOSURE

Method of hydrophilizing and imparting anti-fog properties to hydrophobic, transparent, polymeric objects adapted for use as optical aids comprising swelling the surface of a hydrophobic, transparent, polymeric object by contacting said object with at least one hydrophilic monoethylenically unsaturated monomer and thereafter polymerizing said monomer in the presence of a polymerization initiator to thereby form a hydrophilic, polymeric layer integrally bonded to said hydrophobic polymer surface. These monomers are selected from the group consisting of ethylene glycol methacrylate, butyl methacrylate, benzyl methacrylate, dialkyl carbonate, acrylamide, methacrylamide, and mixtures thereof.

BACKGROUND OF THE INVENTION

The present invention relates to a method of hydrophilizing transparent objects made of hydrophobic organic polymers, which in use get into contact with water or oversaturated water vapors.

A drawback of transparent objects, such as, for example, optical lenses made of the so-called organic glass, resides in their hardness and poor water wettability manifesting itself by water vapor condensation and loss on transparency, if they are transferred from cool atmosphere into warm one containing a higher water vapor concentration. Contact lenses from hard materials can be given relatively exact optical characteristics, such as, for instance, anastigmatical cut, or the like, but their considerable disadvantage consists in their hardness which is incompatible with properties of eyeball surface, irrespective of traumatic eventualities.

SUMMARY OF THE INVENTION

According to the present invention a method of hydrophilizing transparent objects made of organic polymers is proposed, which objects in use get into contact with water or oversaturated water vapor, the method comprising the steps of allowing the object to swell from the surface by means of a monomer or monomer mixture apt to build a hydrophilic polymer, polymerizing said monomer or monomer mixture and working the hydrophilic superficial layer of said object.

In accordance with another feature of the invention, a monomer or monomer mixture miscible with the aforesaid monomer or monomer mixture and apt to form a hydrophobic polymer is added thereto.

Still another feature of the invention consists in that to said monomer or monomer mixture apt to build a hydrophilic polymer there is added a solvent for the same in which said hydrophobic polymer is liable to swell, said solvent being removed by drying before the working of said object.

DESCRIPTION OF THE PREFERRED EMBODIMENTS

As hereinabove referred to, it has surprisingly been found out now that hard hydrophobic lenses, glasses for diver's goggles, gas masks, or the like, can be preferably hydrophilized in that an object made of organic glass, such as e.g. polymethyl methacrylate, polydiallyl carbonate, etc., is allowed to swell in a dry hydrophilic monomer, such as, for example, monomeric ethyleneglycol monomethacrylate containing eventually 2 percent of dimethacrylate at the most, or in a mixture of ethyleneglycol monomethacrylate with acrylamide or methacrylamide or with a mixture of the two lastmentioned compounds, or in glycol monoacrylate, there being preferably added methyl methacrylate, butyl methacrylate, benzyl methacrylate, diallyl carbonate or the like hydrophobic monomer which is at least partially miscible with the basic hydrophilic monomer and which facilitates the joining of the hydrophilic polymer with the hydrophobic one, or a solvent for the respective monomers, in which solvent the hydrophobic polymer is liable to swell, or, eventually, a mixture of the hydrophobic monomer with such a solvent. Under the term "hydrophobic monomer," it is to be understood such a monomer by the polymerization of which a hydrophobic polymer will arise, the monomer itself being at least partially miscible with hydrophilic monomers employed for the hydrophilizing process. As an example of such "hydrophobic" monomers there can be named methyl methacrylate, or acrylonitrile. After the superficial layer of the hydrophobic polymer has been duly swollen into the desired depth the present monomers get polymerized according to one of the hereinafter described methods. The polymerization once finished, the surface of the object is mechanically worked, as for instance by cutting, or polishing. The thus worked contact lenses are advantageously to be kept immersed in water of physiological solution while the other objects, such as spectacles glasses and the like, can be stored in atmosphere.

If a solvent is used it is necessary at first to dry the lens or another object from organic glass after the polymerization has finished.

By using the method according to the present invention it is possible to obtain, on the hydrophobic polymer, a superficial hydrophilic layer of which thickness is within a range of from one hundredth to about one millimeter, the layer resisting to water vapors condensation if transferred from cool to warm atmosphere, and being sufficiently soft, if swollen by water of physiological solution, so that the contact lens is much more agreeable for the wearer. The layer, if dry, possesses such a high water absorptivity as not to get misty even under extreme conditions. Due to cross-linking the hydrophilic layer is not liable to easy damage even if in fully swollen state. The cross-linking takes place even without any admixture of cross-linking agents by chain transfer on to the polymer.

The polymerization of hydrophilic monomer or monomer mixture can be e.g. carried out by dissolving therein a polymerization initiator which is active at elevated temperatures. After the objects has been swollen by monomer mixture it will be heated to a temperature at which the initiator is decomposed into free radicals at a controllable speed. Perfect bond of the hydrophilic and hydrophobic polymers is ensured by transfer reactions as well as by entanglement of macromolecular chains.

The hydrophobic polymer can comprise itself double bonds by means of which it will join into the hydrophilic polymer being formed. Thus, for instance, a hydrophobic object, such as a lens a spectacle glass, can be prepared by copolymerizing methyl methacrylate with ethylene glycol dimethacrylate, allyl methacrylate or diallyl carbonate so that the crosslinked copolymer contains moreover side vinyl or allyl groups which have not been consumed during the copolymerization.

Another method of polymerizing hydrophilic monomer mixture within the superficial layer of swollen hydrophobic polymer consists in ionizing irradiation by rays of a suitable wave length, such as, for example, by gamma-ray emission or X-rays, or, eventually, by U.V.-radiation, or even by visible light in the presence of suitable sensibilizers or initiators capable to be decomposed by said light into active free radicals.

According to the method as hereinbefore referred to there can be processed objects made from various transparent hydrophobic both linear and cross-linked polymers, such as polymeric styrene, diallyl carbonate, polycarbonate from bisphenol A (diane), silicone rubber, various polymeric esters of acrylic, methacrylic, itaconic and other unsaturated polymerizable acids etc.

The following examples are given as illustrative only without, however, limiting the invention to the specific details thereof.

EXAMPLE I

A lens made of polymethyl methacrylate was allowed to swell for 24 hours in a mixture of methyl methacrylate with glycol monomethacrylate (molar ratio 1:3). The swollen lens was polymerized in an inert atmosphere by U.V.-irradiation. After polymerization the surface of lens was polished and the lens was allowed to swell in water or physiological solution.

EXAMPLE II

A lens made of polymethyl methacrylate prepared by copolymerizing methyl methacrylate with glycol dimethacrylate so that it contained appended vinyl groups, was allowed to swell for a period of 48 hours in glycol monomethacrylate containing 0.05 percent by weight of methyl azo-bis-isobutyrate. The swollen lens was polymerized for 10 hours at 60° centigrade. After polymerization the lens was mechanically worked and stored by immersing into physiological solution.

EXAMPLE III

Polymethacrylate lens was allowed to swell for 6 hours in a mixture of benzene and glycol monomethacrylate (ratio 2:3). The swollen lens was polymerized in an inert atmosphere by means of gamma-ray emission. After the polymerization the lens was freed of benzene by drying in vacuo whereupon it was mechanically worked and stored in physiological solution.

EXAMPLE IV

A polydimethyl siloxane lens was allowed to swell in a mixture of solvents, such as e.g. benzene with 3-hydroxy-propyl methacrylate (molar ratio 2:3). The lens once swollen was polymerized by gamma-radiation. After the polymerization the lens was freed of the solvent mixture in vacuo and stored in physiological solution.

EXAMPLE V

A spectacle glass made of poly(diethylene glycol-bis-allyl-carbonate) was allowed to swell in a mixture of solvents, such as, for example, toluene, and glycol monomethacrylate (molar ratio 1:2), containing 0.05 percent by weight of diisopropyl percarbonate. The swollen lens was polymerized for 10 hours at 60° centigrade. After the polymerization the solvent was removed in vacuo, the lens surface was mechanically worked, and the lens was immersed into physiological solution.

EXAMPLE VI

A polystyrene lens was allowed to swell in a mixture of styrene and 2-hydroxy-propyl methacrylate (molar ratio 1:2). The swollen lens was polymerized by X-ray irradiation.

EXAMPLE VII

A lens made of polycarbonate, such as, for instance, Lexan or Makrolon S (reg. trademarks) was allowed to swell in a solvent mixture of e.g. chloroform and diglycol monomethacrylate (molar ratio 1:1). The lens once swollen was then polymerized by irradiation by $^{60}Co$ isotope. After the polymerization had been finished the lens was freed of the solvent in vacuo and stored in physiological solution.

Without further analysis, the foregoing will so fully reveal the gist of the present invention that others can by applying current knowledge readily adapt it for various applications without omitting features that from the standpoint of prior art clearly constitute essential characteristics of the generic or specific aspects of this invention and therefore, such adaptations should and are intended to be comprehended within the meaning and range of equivalence of the following claims.

What is claimed as new and desired to be protected by Letters Patent is set forth in the appended claims.

1. A method of hydrophilizing and imparting anti-fog properties to hydrophobic, transparent, polymeric objects adapted for use as optical aids comprising contacting the surface of a hydrophobic, transparent, polymeric object with a coating composition consisting esesntially of hydrophilic monoethylenically unsaturated monomeric constituents, swelling the surface of said object, and thereafter polymerizing said monomeric constituents in the presence of a polymerization initiator to form a hydrophilic, polymeric layer integrally bonded to said hydrophobic polymer surface.

2. A method according to claim 1 wherein said polymeric objects are selected from the group consisting of lower alkyl esters of acrylic and methacrylic acid, polystyrene, poly(diethylene glycol-bis-allyl carbonate) polycarbonate, silicone rubber and polydimethyl siloxane.

3. A method according to claim 1 wherein said monomeric constitutents are selected from the group consisting of ethylene glycol methacrylate, butyl methacrylate, benzyl methacrylate, diallyl carbonate, acrylamide, methacrylamide and mixtures thereof.

4. A method according to claim 1 wherein said monomeric constituents are employed in an inert solvent.

5. A method according to claim 4 including removing any excess solvent following said polymerization reaction.

6. A method according to claim 4 wherein said solvent is selected from the group consisting of benzene, toluene, and chloroform.

7. A method according to claim 1 wherein said hydrophilic monomeric constituents are polymerized in the presence of a crosslinking agent.

(References on following page)

References Cited

UNITED STATES PATENTS

| | | | |
|---|---|---|---|
| 2,959,565 | 10/1960 | Stanton et al. | 117—93.31 |
| 3,250,642 | 5/1966 | Parasacco et al. | 117—93.31 |
| 3,286,322 | 11/1966 | Sneary | 117—93.31 |
| 3,101,275 | 8/1963 | Cairns et al. | 117—93.31 |
| 3,188,228 | 6/1965 | Magat et al. | 117—93.31 |
| 3,281,263 | 10/1966 | Priesing et al. | 117—62 |
| 3,290,415 | 12/1966 | Tanner | 117—93.31 |
| 3,552,986 | 11/1971 | Bassemir et al. | 117—93.31 |
| 2,873,240 | 2/1959 | Miller | 117—93.31 |
| 2,999,056 | 9/1961 | Tanner | 117—93.31 |
| 3,101,276 | 8/1963 | Hendrichs | 117—93.31 |
| 3,188,229 | 6/1965 | Graham | 117—93.31 |
| 3,389,012 | 6/1968 | Hamm | 117—93.31 |
| 3,515,579 | 6/1970 | Shepherd et al. | 117—161 UC |
| 3,515,567 | 6/1970 | Tani et al. | 117—64 R |
| 3,361,858 | 6/1968 | Wichterle | 264—343 |
| 3,496,254 | 2/1970 | Wichterle | 264—343 |
| 3,221,083 | 11/1965 | Crandon | 264—343 |
| 3,542,907 | 11/1970 | Wichterle | 264—343 |
| 3,621,079 | 11/1971 | Leeds | 117—138.8 A |
| 3,628,988 | 12/1971 | Stol et al. | 117—63 |
| 3,520,949 | 7/1970 | Shepherd et al. | 117—161 UC |

MURRAY KATZ, Primary Examiner

M. SOFOCLEOUS, Assistant Examiner

U.S. Cl. X.R.

117—138.8 F, U, A, 93.31; 106—13; 264—343; 351—160